Patented Dec. 19, 1944

2,365,499

UNITED STATES PATENT OFFICE 2,365,499

PROCESS FOR ISOLATION OF GRAMICIDIN

Max Tishler, Rahway, N. J., assignor to Merck & Co., Inc., Rahway, N. J., a corporation of New Jersey No Drawing. Application September 30, 1941, Serial No. 413,003

6 Claims. (Cl. 260—236.5)

This invention relates to a process for the isolation of a non-proteinous crystalline substance from the incubated cultures of certain spore-forming bacilli.

It is known that this non-proteinous crystalline substance, which has been named gramicidin, possesses a high bactericidal activity against gram-positive microorganisms in vitro and in mice. Other active substances have been isolated from the same cultures of spore-forming bacilli, but only gramicidin has been found to show high activity in animal experiments.

According to the prior art, the first step in the isolation of the active principles from an incubated culture of certain spore-forming bacilli, when their bacterial growth period was completed, consisted in the acidification of the incubated culture to pH 4.5. The active principles separated during that process. The resulting mixture was filtered, the precipitate was extracted with ethyl alcohol, and from the alcoholic extract a crude mixture was obtained which showed bactericidal activity in vitro and in vivo.

It has been found by the applicant that the crude active mixture can be isolated from the incubated culture without recourse to acidification.

In the applicant's process of isolating the crude active mixture, the incubated culture is centrifuged and the waxy residue is extracted with a neutral organic solvent, such as ethanol, or acetone, or dioxane. A crude highly active mixture is obtained by concentrating the extracts to dryness. This crude active mixture is characterized by a much lighter color than that of the mixture obtained by previous processes.

That this crude active mixture can be so obtained is a surprising discovery in view of the fact that previous investigators indicated that the non-proteinous and water-insoluble active agents are, in the culture, conjugated in some way to a protein, and that the active principle is present in the culture solution in this conjugated state. Those earlier workers had found that when the culture was acidified the protein was split off and the water-insoluble active agents were liberated. Their proteinous agent, so obtained, was found to be inactivated on the acid side but stable at alkaline reaction.

The fact that the applicant's cultures after incubation have a pH of about 8 to 9 and contain most of the active agent in the insoluble form is surprising. It is a discovery which has a practical advantage, for the adjustment of the pH of the culture to 4.5 was laborious and caused loss of time, especially as the culture at the end of the incubation period is saturated with carbon dioxide which interferes with the adjustment of pH.

Earlier workers in the art isolated the gramicidin from the crude active mixture by a somewhat lengthy procedure, and they reported that the in-vivo active material, gramicidin, isolated from the crude active mixture, is insoluble in ether.

The applicant has found, on the contrary, that gramicidin does have an appreciable solubility in ether, that its solubility in ether is sufficiently high to permit of its extraction from the crude active mixture by a process of continuous extraction, and that the gramicidin so extracted is largely free of other active fractions.

When, as the applicant has found, the crude active mixture is placed in an extractor of the Soxhlet type and extracted with ether, a product consisting substantially of gramicidin crystallizes in the ether reservoir during the operation and is finally obtained in good yield.

The gramicidin which is obtained by this ether extraction process, or that which is recrystallized from organic solvents, tends to become somewhat gummy and brittle when allowed to dry in air. However, the applicant has found that the gramicidin, so extracted or recrystallized, can be dried in air without such disadvantageous physical change if it is previously washed with petroleum ether.

In the applicant's production of the crude active mixture, the culture of spore-forming bacilli is prepared, inoculated, and incubated in the manner described in the literature. These bacilli which are capable of producing gramicidin are a well-defined group, comprising *Bacillus brevis*, and are related in morphological and biochemical characteristics. When the incubation period is over, the mixture is separated in a centrifuge operating at a speed of about 25,000 revolutions per minute. The waxy solid residue is next triturated with about four volumes of a neutral organic solvent and the mixture is allowed to stand for about 18 hours at about room temperature. Then the mixture is filtered, and the filtrate is concentrated to dryness under reduced pressure, the outside temperature being below 50° C. The residue is the crude active mixture, which is a light tan powder, of which a litre of incubated culture yields between about 150 and 200 mg.

In the applicant's process for the isolation of gramicidin, 100 grams of the crude active mixture is placed in a Soxhlet extractor, and the mixture is extracted continuously with absolute ether. After a few hours the ether in the pot-still becomes yellow and turbid. Within 24 hours an appreciable quantity of solid is present in the still. The extraction is continued for about 2 to 7 days, according to the efficiency of the extractor. The product is separated by filtration and washed well with petroleum ether. About 10 to 12 grams of substantially pure gramicidin is obtained, which may be recrystallized from acetone.

Gramicidin isolated in this manner appears as white platelets which melt at 228° to 230° C. It is readily soluble in acetone, alcohol, dioxane, acetic acid, and ethyl acetate, but very slightly soluble in water. Anal.: C, 62.5; H, 7.5; N, 14.3. Its absorption in the ultra violet shows maxima at 2815 and 2910 and minima at 2475 A. U. When an alcoholic solution of gramicidin is mixed with an alcoholic solution of flavianic acid, a yellow crystalline product is formed which melts at 220° C.

The foregoing examples have been given by way of illustration, and not of limitation.

I claim:

1. Process for the production of gramicidin which comprises the steps of centrifuging off the solid material, at speeds in excess of 3,500 R. P. M., from an unacidified incubated culture of a spore forming bacillus which produces gramicidin, extracting the said solid material with a neutral organic water-miscible solvent, removing this solvent from the extract, extracting the resulting residue with ether, separating the ether from the ether extract, and washing the product with petroleum ether.

2. Process for the production of gramicidin which comprises the steps of centrifuging off the solid material, at speeds in excess of 3,500 R. P. M., from an unacidified incubated culture of a spore forming bacillus which produces gramicidin, extracting the said solid material with ethanol, removing this solvent from the extract, extracting the resulting residue with ether, separating the ether from the ether extract, and washing the product with petroleum ether.

3. Process for the production of gramicidin which comprises the steps of centrifuging off the solid material, at speeds in excess of 3,500 R. P. M., from an unacidified incubated culture of a spore forming bacillus which produces gramicidin, extracting the said solid material with acetone, removing this solvent from the extract, extracting the resulting residue with ether, separating the ether from the ether extract, and washing the product with petroleum ether.

4. Process for the production of gramicidin which comprises the steps of centrifuging off the solid material, at speeds in excess of 3,500 R. P. M., from an unacidified incubated culture of a spore forming bacillus which produces gramicidin, extracting the said solid material with dioxane, removing this solvent from the extract, extracting the resulting residue with ether, separating the ether from the ether extract, and washing the product with petroleum ether.

5. In a process for the production of gramicidin by centrifuging off the solid material, at speeds in excess of 3,500 R. P. M., from an unacidified incubated culture of a spore forming bacillus which produces gramicidin, extracting the said solid material with a neutral organic water-miscible solvent, removing this solvent from the extract, extracting the resulting residue with ether, and separating the ether from the ether extract, the step of washing the residue from the ether extract with petroleum ether.

6. In a process for the production of gramicidin by centrifuging off the solid material, at speeds in excess of 3,500 R. P. M., from an unacidified incubated culture of a spore forming bacillus which produces gramicidin, extracting the said solid material with a neutral organic water-miscible solvent, and removing this solvent from the extract, the step of the continuous extraction of the gramicidin from the resulting residue by means of ether.

MAX TISHLER.